United States Patent
Park et al.

(10) Patent No.: US 10,244,247 B2
(45) Date of Patent: Mar. 26, 2019

(54) ENHANCED DATA PROCESSING APPARATUS EMPLOYING MULTIPLE-BLOCK BASED PIPELINE AND OPERATION METHOD THEREOF

(71) Applicant: SAMSUNG ELECTRONICS CO., LTD., Suwon-si (KR)

(72) Inventors: Chan-sik Park, Hwaseong-si (KR); Myung-ho Kim, Seoul (KR); Sang-kwon Na, Seoul (KR); Ki-won Yoo, Seoul (KR); Chang-su Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 206 days.

(21) Appl. No.: 15/251,476

(22) Filed: Aug. 30, 2016

(65) Prior Publication Data
US 2017/0134740 A1  May 11, 2017

(30) Foreign Application Priority Data

Nov. 5, 2015  (KR) .......................... 10-2015-0155280

(51) Int. Cl.
*H04N 19/436* (2014.01)
*H04N 19/523* (2014.01)
*H04N 19/80* (2014.01)
*H04N 19/105* (2014.01)
*H04N 19/13* (2014.01)
*H04N 19/124* (2014.01)
(Continued)

(52) U.S. Cl.
CPC ......... *H04N 19/436* (2014.11); *H04N 19/105* (2014.11); *H04N 19/124* (2014.11); *H04N 19/13* (2014.11); *H04N 19/433* (2014.11); *H04N 19/523* (2014.11); *H04N 19/80* (2014.11); *H04N 19/17* (2014.11); *H04N 19/176* (2014.11); *H04N 19/182* (2014.11)

(58) Field of Classification Search
CPC .. H04N 19/105; H04N 19/523; H04N 19/436; H04N 19/433; H04N 19/13; H04N 19/124; H04N 19/80; H04N 19/182; H04N 19/176
USPC .................................................... 375/240.17
See application file for complete search history.

(56) References Cited

U.S. PATENT DOCUMENTS 5,909,638 A * 6/1999 Allen .................... G06Q 30/06
                                                      348/E7.073
6,018,796 A    1/2000 Suzuki et al.
(Continued)

FOREIGN PATENT DOCUMENTS

KR    10-0471794 B1    5/2005
KR    10-1172346 B1    8/2012

*Primary Examiner* — Zaihan Jiang
(74) *Attorney, Agent, or Firm* — Sughrue Mion, PLLC

(57) ABSTRACT

Provided are a method and an apparatus for decoding an image by accessing a memory by a block group. The method comprises checking information regarding a size of one or more blocks included in a bitstream of an encoded image, determining whether to group one or more blocks for performing decoding, based on the information regarding the size of the one or more blocks, setting a block group including one or more blocks based on the information regarding the size of the one or more blocks, and accessing a memory by the block group to perform a parallel-pipeline decoding process by the block group.

17 Claims, 8 Drawing Sheets

(51) Int. Cl.
*H04N 19/433* (2014.01)
*H04N 19/17* (2014.01)
*H04N 19/176* (2014.01)
*H04N 19/182* (2014.01)

(56) References Cited

U.S. PATENT DOCUMENTS

| | | | | |
|---|---|---|---|---|
| 6,449,395 B1* | 9/2002 | Kobayashi | ........... | H04N 19/176 |
| | | | | 375/E7.14 |
| 2007/0230572 A1* | 10/2007 | Koto | ............ | H04N 19/105 |
| | | | | 375/240.12 |
| 2009/0196517 A1* | 8/2009 | Divorra Escoda | ... | H04N 19/176 |
| | | | | 382/240 |
| 2011/0044551 A1* | 2/2011 | Lee | ............ | H04N 19/105 |
| | | | | 382/238 |
| 2012/0224624 A1* | 9/2012 | Wang | ............ | H04N 19/139 |
| | | | | 375/240.03 |
| 2012/0230401 A1* | 9/2012 | Chen | ............ | H04N 21/44016 |
| | | | | 375/240.12 |
| 2013/0028322 A1* | 1/2013 | Fujibayashi | ........... | H04N 19/61 |
| | | | | 375/240.12 |
| 2013/0177070 A1* | 7/2013 | Seregin | ............ | H04N 19/13 |
| | | | | 375/240.02 |
| 2013/0272409 A1* | 10/2013 | Seregin | ............ | H04N 19/56 |
| | | | | 375/240.16 |
| 2013/0322766 A1* | 12/2013 | Alpert | ............ | G06K 9/481 |
| | | | | 382/197 |
| 2015/0085931 A1* | 3/2015 | Cote | ............ | H04N 19/439 |
| | | | | 375/240.16 |
| 2016/0021385 A1* | 1/2016 | Chou | ............ | H04N 19/513 |
| | | | | 375/240.16 |

* cited by examiner

ENHANCED DATA PROCESSING APPARATUS EMPLOYING MULTIPLE-BLOCK BASED PIPELINE AND OPERATION METHOD THEREOF

CROSS-REFERENCE TO RELATED APPLICATION

This application claims priority from Korean Patent Application No. 10-2015-0155280, filed on Nov. 5, 2015, in the Korean Intellectual Property Office, the disclosure of which is incorporated herein by reference in its entirety.

BACKGROUND

1. Field

Methods and apparatuses consistent with exemplary embodiments relate to an enhanced data processing apparatus employing a multiple-block based pipeline and an operation method thereof, and more particularly, to a method and an apparatus for decoding an image by accessing a memory device via a block group including a plurality of blocks to perform a parallel-pipeline decoding process on the block group.

2. Description of the Related Art

When images or sounds are transformed into digital data, a size of the transformed digital data is quite large. If the digital data is not compressed, the digital data occupies a significantly large space in memory and large bandwidth is necessary for transmission of such large-sized data. Therefore, a compression technique for reducing the size of digital data is necessary, and efficiency of storage space utilization and data transmission via a network may be improved by employing a compression technique.

Examples of image compression formats include GIF and JPEG. Examples of video and sound compression formats include MPEG, H.263, H.264/AVC, and H.265 (HEVC). High efficiency video coding (referred to hereinafter as 'HEVC') is the latest video coding standard and was introduced by the Joint Collaborative Team on Video Coding (JCT-VC) in 2013.

HEVC introduced a coding unit (CU) having a hierarchically recursive quadtree split structure, instead of a fixed-sized macro block employed in conventional image coding standards, such as H.264/AVC. Compared to conventional image coding standards, HEVC exhibits significantly improved compression efficiency due to the quadtree structure, but the calculation complexity is correspondingly significantly increased. One frame is split into maximum coding units (MCUs) having sizes, for example up to 64×64 or 128×128, and the maximum coding unit may be repeatedly split until the maximum coding unit is split into smallest coding units (SCUs) having sizes of 8×8 or 4×4, for example.

Furthermore, an input video stream is split into groups of pictures (GOP), which each include a series of pictures or frames. Each GOP includes a plurality of pictures, and each picture is split into a plurality of slices. Furthermore, two types of pictures may appear within a single GOP, that is, an intra mode picture (or I-picture) and a prediction motion-compensated picture (P-picture or B-picture).

In an I-picture, all blocks are decoded in an intra mode without motion compensation. Only a unidirectional prediction for selecting a reference picture from a single reference picture list may be performed with regard to a P-picture, whereas a bidirectional prediction employing two reference picture lists and a unidirectional prediction employing a single reference picture list may be selectively employed with regard to a B-picture. The prediction motion-compensated picture (P-picture or B-picture) may be decoded in an inter mode, in which each block utilizes motion compensation.

An image decoding system generally includes a memory for storing an input video stream and frames for performing motion compensation.

In the image decoding system, memory accesses may include: 1) a memory access for entropy-decoding, 2) a memory access for inter mode prediction with regard to each block size, 3) a memory access with respect to surrounding blocks for intra mode prediction, 4) a memory access for filtering, and 5) a memory access for writing a final reconstructed image to a memory. The access with respect to surrounding blocks for intra mode prediction and memory access for filtering may use internal memory. Particularly, from among the memory accesses, the memory access for inter mode prediction requires the largest memory bandwidth.

H.265/HEVC, which has been recently suggested as a new international moving picture coding standard, employs various blocking processing units and significantly more complicated techniques for motion prediction and motion compensation, as compared to conventional image coding standards. Thus, frequency of memory access for motion compensation is significantly increased. Therefore, there is a demand for an efficient memory accessing technique for an image decoding apparatus. Furthermore, because H.264/AVC employs a 16×16 macro block (MB) as the only basic processing unit, there is a demand for an efficient memory accessing technique due to a large quantity of memory accesses for motion compensation in the instance of processing a large image, e.g., an ultra high definition (UHD) image.

SUMMARY

Methods and apparatuses consistent with exemplary embodiments relate to decoding an image with respect to all blocks by accessing a memory by a block group and performing a parallel-pipeline decoding process on the block group, thereby processing speed may be increased.

Additional aspects will be set forth in part in the description which follows and, in part, will be apparent from the description, or may be learned by practice of the presented exemplary embodiments.

According to an aspect of an exemplary embodiment, there is provided a method of decoding an image, the method including obtaining size information regarding a size of one or more blocks included in a bitstream of an encoded image; grouping a plurality of blocks among the one or more blocks into a block group for performing decoding of the plurality of blocks, based on the size information of the plurality of blocks; requesting reference image data corresponding to the plurality of blocks included in the block group from a memory in a memory access request signal; and performing a parallel-pipeline decoding process on the block group, based on the reference image data corresponding to the plurality of blocks included in the block group.

The parallel-pipeline decoding process may include operations for entropy decoding, inverse-quantization/inverse-transformation, intra/inter prediction, reconstruction, and filtering calculation, and each of the operations are sequentially delayed according to a cycle by the block group and performed in parallel.

The grouping may include, determining that the size information of the plurality of blocks indicates that the size of each of the plurality of blocks one or more blocks is less than 16×16 or is 16×16; and, grouping the plurality of blocks in response to determining that the size information of the plurality of blocks indicates that the size of each of the plurality of blocks one or more blocks is less than 16×16 or is 16×16.

The block group may include four 16×16 blocks.

The requesting may include obtaining the reference image data corresponding to the plurality of blocks in the block group from the memory to perform motion compensation.

The obtaining may include generating the memory access request signal by combining request signals for requesting reference image data corresponding to the plurality of blocks included in the block group; transmitting the memory access request signal to the memory; and obtaining the reference image data corresponding to the plurality of blocks included in the block group during a single memory access cycle.

The method may further include checking a motion vector by the block group; and, if the motion vector indicates a half pixel or a quarter pixel, performing interpolation with regard to the reference image data corresponding to the plurality of blocks included in the block group.

The obtaining may include accessing a local cache by the block group to obtain the reference image data corresponding to the plurality of blocks included in the block group.

The obtaining may include analyzing a motion vector by the block group; accessing a multi-way set associative cache by the block group to obtain the reference image data corresponding to the plurality of blocks included in the block group based on a result of the analysis; and, if a cache miss occurs while the multi-way set associative cache is being accessed, updating the multi-way set associative cache based on the result of analyzing the motion vector by the block group.

According to an aspect of an exemplary embodiment, there is provided an image decoding apparatus that accesses a memory by a block group, the image decoding apparatus including an image decoder configured to perform a parallel-pipeline decoding process on a block group of a plurality of blocks; and a memory configured to store data decoded by the image decoder, wherein the image decoder comprises a controller configured to obtain size information regarding a size of one or more blocks included in a bitstream of an encoded image, group the plurality of blocks for performing decoding of the plurality of blocks, based on the size information of the plurality of blocks, request reference image data corresponding to the plurality of blocks included in the block group from a memory in a memory access request signal, and perform a parallel-pipeline decoding process on the block group based on the reference image data corresponding to the plurality of blocks included in the block group.

The parallel-pipeline decoding process may include operations for entropy decoding, inverse-quantization/inverse-transformation, intra/inter prediction, reconstruction, and filtering calculation, and each of the operations are sequentially delayed according to a cycle by the block group and performed in parallel.

The controller may group the plurality of blocks by determining that the size information of the plurality of blocks indicates that the size of each of the plurality of blocks one or more blocks is less than 16×16 or is 16×16; and grouping the plurality of blocks in response to determining that the size information of the plurality of blocks indicates that the size of each of the plurality of blocks one or more blocks is less than 16×16 or is 16×16.

The block group may include four 16×16 blocks.

The controller may obtain the reference image data corresponding to the plurality of blocks in the block group from the memory to perform motion compensation.

The controller may obtain the reference image data corresponding to the plurality of blocks in the block group from the memory by: generating the memory access request signal by combining request signals for requesting reference image data corresponding to the plurality of blocks included in the block group; transmitting the memory access request signal to the memory; and obtaining the reference image data corresponding to the plurality of blocks included in the block group during a single memory access cycle.

The image decoder may check a motion vector by the block group and, if the motion vector indicates a half pixel or a quarter pixel, to perform interpolation with regard to the reference image data corresponding to the plurality of blocks included in the block group.

The controller may obtain the reference image data corresponding to the plurality of blocks in the block group from the memory by accessing a local cache by the block group to obtain the reference image data corresponding to the plurality of blocks included in the block group.

The controller may obtain the reference image data corresponding to the plurality of blocks in the block group from the memory by: analyzing a motion vector by the block group; accessing a multi-way set associative cache by the block group to obtain the reference image data corresponding to the plurality of blocks included in the block group based on a result of the analysis, and, if a cache miss occurs while the multi-way set associative cache is being accessed, the controller configured to update the multi-way set associative cache based on the result of analyzing the motion vector by the block group.

According to an aspect of an exemplary embodiment, there is provided a non-transitory computer readable recording medium having recorded thereon a computer program, which when executed by a decoding apparatus causes the decoding apparatus to execute a method of decoding an image, the method including obtaining size information regarding a size of one or more blocks included in a bitstream of an encoded image, grouping a plurality of blocks among the one or more blocks into a block group for performing decoding of the plurality of blocks, based on the size information of the plurality of blocks, requesting reference image data corresponding to the plurality of blocks included in the block group from a memory in a memory access request signal, and performing a parallel-pipeline decoding process on the block group, based on the reference image data corresponding to the plurality of blocks included in the block group.

BRIEF DESCRIPTION OF THE DRAWINGS

The above and other aspects will become apparent and more readily appreciated from the following description of the exemplary embodiments, taken in conjunction with the accompanying drawings in which.

DETAILED DESCRIPTION OF EXEMPLARY EMBODIMENTS

Figure 1:
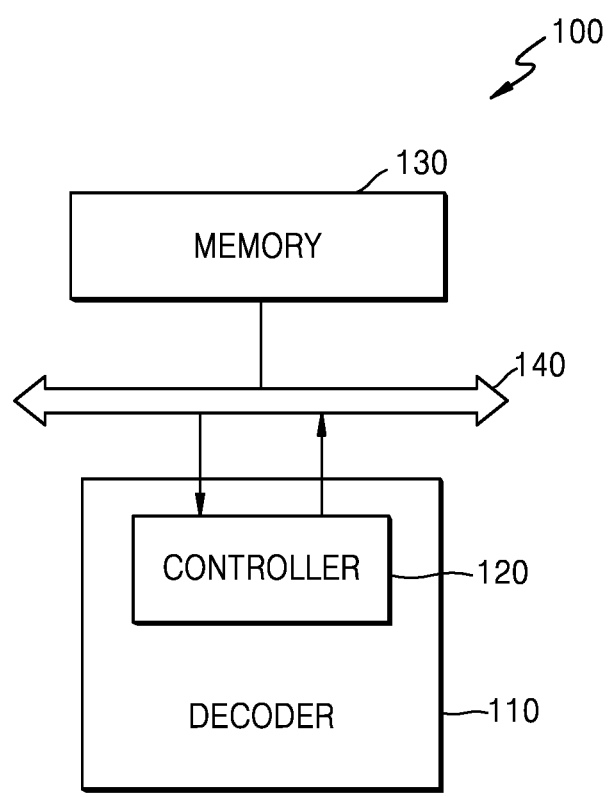
FIG. 1 is a schematic block diagram illustrating an image decoding apparatus according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items.

As the inventive concept allows for various changes and numerous exemplary embodiments, particular exemplary embodiments will be illustrated in the drawings and described in detail in the written description. However, this is not intended to limit the inventive concept to particular modes of practice, and it is to be appreciated that all changes, equivalents, and substitutes that do not depart from the spirit and technical scope of the inventive concept are encompassed in the inventive concept.

It will be understood that, although the terms first, second, third, etc., may be employed herein to describe various elements, components, regions, layers and/or sections, these elements, components, regions, layers and/or sections should not be limited by these terms. Thus, a first element discussed below could be termed a second element, and similarly, a second element may be termed a first element without departing from the teachings of this disclosure.

It will be understood that when a component is referred to as being "connected to" another component, it can be directly or indirectly connected to the other component. That is, for example, intervening components may be present unless the term "directly" is employed in the expression.

The terms employed in the present specification are merely employed to describe particular exemplary embodiments, and are not intended to limit the inventive concept. An expression employed in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Expressions such as "at least one of" do not necessarily modify an entirety of a following list and do not necessarily modify each member of the list, such that "at least one of a, b, and c" should be understood as including only one of a, only one of b, only one of c, or any combination of a, b, and c.

Unless otherwise defined, all terms (including technical and scientific terms) employed herein have the same meaning as commonly understood by one of ordinary skill in the art to which this inventive concept belongs. It will be further understood that terms, such as those defined in commonly employed dictionaries, should be interpreted as having a meaning that is consistent with their meaning in the context of the relevant art and will not be interpreted in an idealized or overly formal sense unless expressly so defined herein.

Hereinafter, exemplary embodiments of the inventive concept will be described in detail with reference to the attached drawings.

FIG. 1 is a schematic block diagram of an image decoding apparatus 100 according to an exemplary embodiment.

Referring to FIG. 1, the image decoding apparatus 100 includes a decoder 110, a controller 120, a memory 130, and a data bus 140.

The decoder 110 reconstructs a displayed image from an input bitstream. In detail, the decoder 110 receives an input of a bitstream, which may be parsed at a stage before the decoder 110, an entropy decoder entropy-decodes the input bitstream. An inverse-quantizer/inverse-transformer inverse-quantizes and inverse-transforms an encoded signal and obtains a residual signal. Furthermore, the decoder 110 obtains a prediction picture based on a motion vector via a motion compensator, wherein the prediction picture and the residual signal are synthesized by a pixel reconstruction unit. To remove a blocking artifact from the synthesized image, the synthesized image is filtered by a filtering unit.

The inverse-quantization and the inverse-transformation may be performed within decoder or may be separately performed by separate decoders, respectively.

The memory 130 stores data that is decoded by the decoder 110 and outputs data stored therein for decoding. For example, a portion of a target frame to be decoded, a portion of or an entire reference frame, parameters for decoding, and information regarding the surrounding of a target block may be stored in the memory 130. Furthermore, a target frame that is currently being decoded and a frame that is not to be referenced as a reference frame may be stored in the memory 130. Operations of the memory 130 are controlled by the controller 120, as described below.

The controller 120 controls access to the memory 130 via the data bus 140. The controller 120 controls data exchange with the memory 130 based on a memory access request from the decoder 110. For example, the controller 120 may read data from the memory 130 via the data bus 140, so that the decoder 110 performs an inter mode prediction with regard to a current frame.

Meanwhile, the controller 120 accesses the memory 130, as described below.

First, when operation of the image decoding apparatus 100 is initiated, the controller 120 checks size information regarding a size of one or more blocks included in a bitstream of an encoded image. The controller 120 may determine whether to set a certain number of blocks as a single block group unit based on the size information. For example, when the size information indicates that a size of each block is 16×16 and the controller 120 confirms that the size of each block included in a bitstream is 64×64 or 32×32, a plurality of blocks may be processed as individual blocks instead of processing as a single unit. However, when the controller 120 confirms that the size of each block included in the bitstream is 16×16, four 16×16 blocks may selected as a group and processed as a single block group unit.

When a block group including one or more blocks is selected, the controller 120 accesses the memory 130 by the block group. Therefore, the decoder 110 may perform a parallel-pipeline decoding operation on the block group.

When data is processed by a block group including one or more blocks, memory access efficiency may be improved as compared to processing individual blocks. For example, when individually decoding four blocks, if the memory is accessed for decoding of each individual block, four initial delays due to memory accesses occur. However, if the controller 120 accesses the memory by a block group including the four blocks, only one initial delay occurs with respect to decoding the four blocks of the block group. Therefore, when a memory is accessed by employing a block group including N blocks (N being an integer), the number of delay occurrences due to memory access may be reduced to 1/N, as compared to individually decoding the blocks.

Meanwhile, from among decoding operations performed by the decoder 110, motion compensation requires the largest number of memory accesses. Because temporally preceding frames and temporally subsequent frames are considered during motion compensation, frequent access to memory that stores a current frame, preceding frames, and/or subsequent frames is performed to the extent that memory bandwidth for performing motion compensation is larger than a sum of memory bandwidths for performing entropy-decoding, intra prediction, and filtering.

To perform motion compensation, the decoder 110 according to an exemplary embodiment may obtain reference image data from a memory by a block group. Here, the controller 120 of the decoder 110 according to an exemplary embodiment may generate an aggregate or combined request signal by aggregating or combining individual request signals for requesting reference image data corresponding to the respective blocks included in the block group. Thereby, the memory may be accessed once via the aggregate or combined request signal. Accordingly, the decoder 110 may obtain the reference image data corresponding to the respective blocks during a single memory access cycle. Here, the aggregate or combined request signal may be an sequential aggregation of request signals with respect to the respective blocks within a block group. Furthermore, if a motion vector indicates a half pixel or a quarter pixel instead of an integer pixel, interpolation may be performed with regard to the reference image data.

As described above, because the image decoding apparatus 100 according to an exemplary embodiment processes data by a block group, the quantity of delays that occur while a memory is being accessed may be reduced. Effects of reduction of the delays include increased real-time processing speed of the image decoding apparatus 100 and reduce power consumption of the image decoding apparatus 100 due to efficient utilization of memory.

Meanwhile, decoding operations performed by the decoder 110 are performed in a pipeline architecture on a block group including one or more blocks. In other words, entropy-decoding, inverse-quantization/inverse-transformation, and filtering are sequentially delayed according to a cycle by a block unit and the operations are performed in parallel. At the same time, data transmissions between respective processors are pipelined. As a result, performance of the decoder 110 may be improved. Detailed descriptions of a parallel-pipeline decoding process performed by the image decoding apparatus 100 according to an exemplary embodiment will be given below with reference to FIG. 5B.

Figure 2:
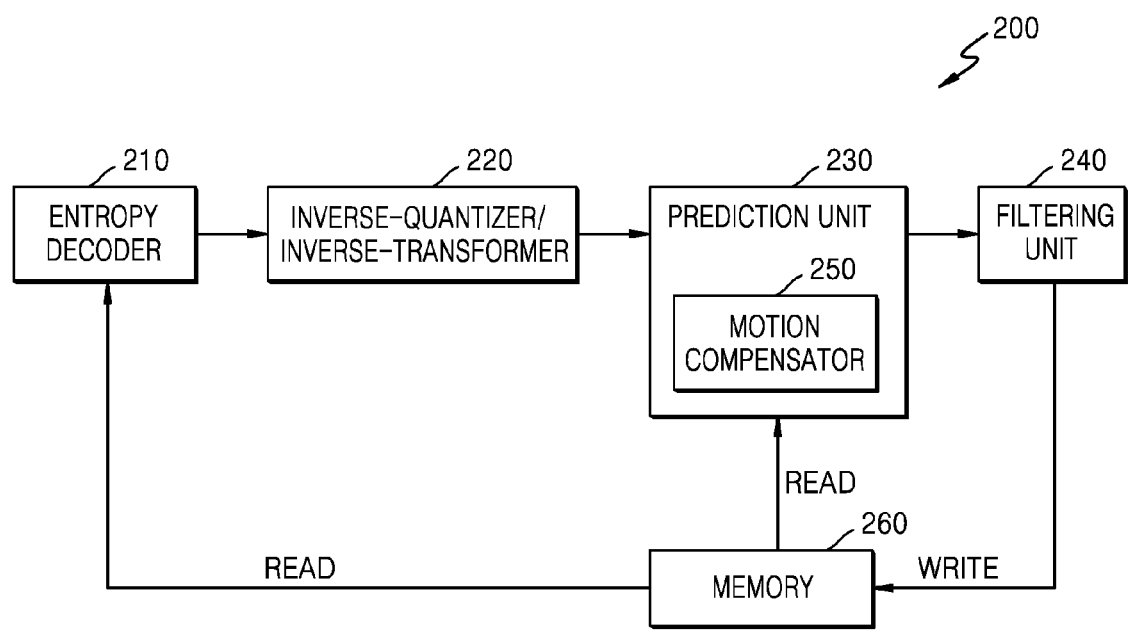
FIG. 2 is a block diagram illustrating read and write paths of an image decoding apparatus according to an exemplary embodiment.

FIG. 2 is a block diagram illustrating read and write paths of an image decoding apparatus according to an exemplary embodiment.

Referring to FIG. 2, the image decoding apparatus 200 includes an entropy decoder 210, an inverse-quantizer/inverse-transformer 220, a prediction unit 230, a filtering unit 240, and a memory 260. The image decoding apparatus 200 shown in FIG. 2 may correspond to the image decoding apparatus 100 of FIG. 1 described above, and therefore redundant description thereof is omitted for brevity.

The entropy decoder 210 performs a read operation for receiving an input of a compressed bitstream by accessing the memory 260 and entropy-decodes a bitstream received from the memory 260.

The inverse-quantizer/inverse-transformer 220 inverse-quantizes the entropy-decoded bitstream and inverse-transforms the inverse-quantized bitstream.

The prediction unit 230 performs intra prediction or inter prediction based on whether an image is compressed based on intra prediction or inter prediction. In other words, the prediction unit 230 includes a intra prediction unit and a motion compensator 250. The intra prediction unit performs intra prediction, whereas, if an image is compressed based on inter prediction, the motion compensator 250 reads out a reference image stored in the memory 260 and performs motion compensation. Here, due to large size, the reference image is stored in the memory 260, and the controller 120 obtains the reference image by accessing the memory 260 by a block group. Meanwhile, the motion compensator 250 may also perform motion compensation by employing reference image data provided via a cache. Detailed descriptions thereof will be given below with reference to FIG. 3.

The filtering unit 240 may include a deblocking filter (DF) for reducing a blocking phenomenon that may occur between blocks during reconstruction of a bitstream. The filtering unit 240 may include a deblocking engine that performs deblocking filtering and a direct memory access (DMA) for storing data in the memory 260. If a flag of the filtering unit 240 is activated after inter mode prediction or intra mode prediction is performed, the image decoding apparatus 200 stores reconstructed image data in the memory 260 after a filtering operation. If the flag of the filtering unit 240 is not activated, the image decoding apparatus 200 stores reconstructed image data in the memory 260 immediately after an inter mode prediction or an intra mode prediction.

Figure 3:
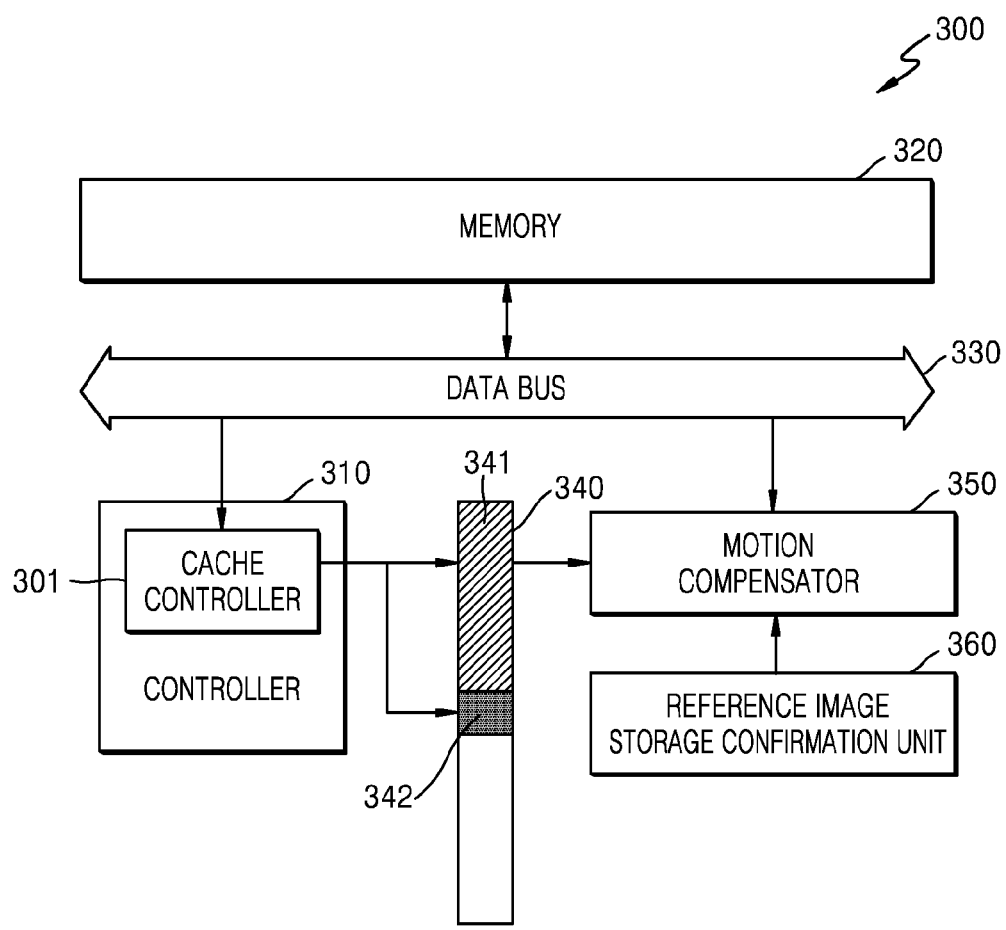
FIG. 3 is a block diagram illustrating a datapath along which an image decoding apparatus according to an exemplary embodiment obtains reference image data via a cache.

FIG. 3 is a block diagram illustrating a datapath along which an image decoding apparatus according to an exemplary embodiment obtains reference image data via a cache.

Referring to FIG. 3, the image decoding apparatus 300 includes a controller 310, a cache controller 301, a memory 320, a data bus 330, a cache 340, a motion compensator 350, a reference image storage confirmation unit 360. The image decoding apparatus 300 may reduce a bandwidth occupied by the data bus 330 by employing the cache 340. The image decoding apparatus 300 shown in FIG. 3 may correspond to the image decoding apparatus 100 of FIG. 1 and the image decoding apparatus 200 of FIG. 2 described above, and therefore redundant descriptions thereof are omitted for brevity.

In detail, the cache controller 301 references a bandwidth that may be employed by the image decoding apparatus 300 from among bandwidths of the data bus 330 into account and determines the size of a data unit to be periodically stored in the cache 340. For example, a unit for storing reference image data may have a size of each reference block or a size corresponding to a number of reference blocks. The cache controller 301 may select data corresponding to the unit for storing reference image data from data stored in the memory 320.

The cache 340 stores reference image data for motion prediction and motion compensation regarding a current cycle as mass data 341 and stores reference image data for motion prediction and motion compensation regarding a next cycle as update data 342. The cache controller 301 according to an exemplary embodiment may control the cache 340 to update stored reference image data, indicated as update data 342 in a previous cycle, into mass data 341 to be referenced to perform motion prediction and motion compensation in a current cycle. Therefore, the reference image data employed for motion prediction and motion compensation in the current cycle has been stored as update data 342 in the cache 340 before the current cycle. Furthermore, the cache controller 301 according to an exemplary embodiment may control to update the cache 340 with data selected for a next cycle as the update data 342.

To operate the motion compensator 350, motion vector and reference index are necessary. The reference image storage confirmation unit 360 may check whether reference image data corresponding to input motion vector and reference index is stored in the cache 340 and output a result of the determination to the motion compensator 350. The motion compensator 350 may utilize reference data input from the memory 320 and/or the cache 340 based on the motion vector and reference index.

Meanwhile, the cache 340 according to an exemplary embodiment may be a local cache or a multi-way set associative cache. A multi-way set associative cache may include memory locations of a multi array (N-way set) related to respective index values of the cache. Therefore, data values stored in a multi-way set associative cache may be arranged based on indexes and numbers for identifying ways and sets related to the data values.

The cache controller 301 according to an exemplary embodiment may employ a control signal for driving a multi-way set associative cache, and the control signal may include an index value and a tag value. The tag value included in the control signal may be compared to a plurality of tags of an N-way set. If an arbitrary way set related to the index value included in the control signal does not include a tag corresponding to the tag value, a cache miss occurs, and a request for searching for cache-missed data is made to the memory 320.

If the cache 340 according to an exemplary embodiment is a local cache, the motion compensator 350 may access the local cache by a block group to obtain reference image data.

If the cache 340 according to an exemplary embodiment is a multi-way set associative cache, the reference image storage confirmation unit 360 analyzes input motion vector and reference index, and the reference image storage confirmation unit 360 may access a multi-way set associative cache by a block group based on the analyzed motion vector and reference index. Additionally, if a cache miss occurs while the multi-way set associative cache is being accessed, the multi-way set associative cache may be updated by sending a multiple request to a bus related to a cache-missed block group based on an analysis of motion vectors performed by a block group.

Figure 4A:
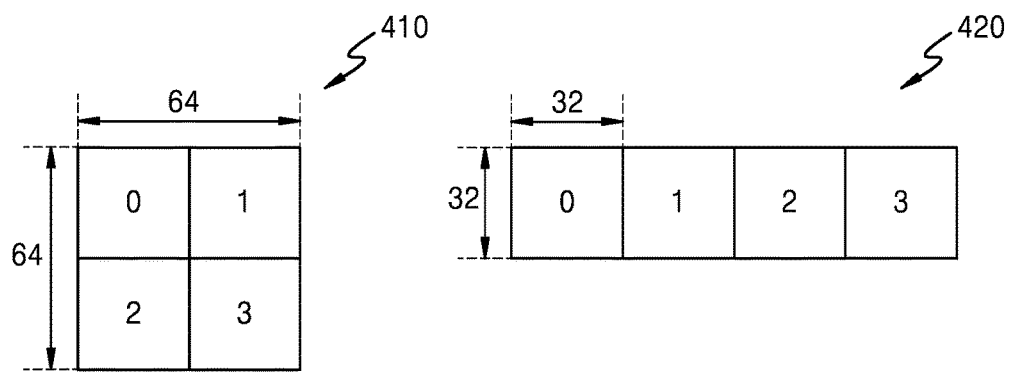
FIG. 4A is a diagram illustrating a block processing unit of an image decoding system according to an exemplary embodiment.

FIG. 4A is a diagram illustrating a block processing unit of an image decoding system according to an exemplary embodiment.

Along with suggestion of new image compression techniques, various block processing units of image codecs are being introduced. For example, the block processing unit for the H.264/AVC codec is 16×16, the block processing unit for the VP9 codec is 64×64, the block processing unit for the HEVC standard codec is 64×64, 32×32, or 16×16, and the block processing unit for the AVS2 codec is 64×64, 32×32, or 16×16.

A fixed-sized block or blocks of various sizes may be employed as a block processing unit of an image decoding system. For example, when a parallel-pipeline decoding process is performed by employing fixed-sized blocks (e.g., 32×32 blocks), the size of a buffer memory may be reduced. However, processing a block having a larger size (e.g., a 64×64 block) and processing a block having a smaller size (e.g., a 16×16 block) in real time increases complexity. On the other hand, when a parallel-pipeline decoding process is performed by employing blocks of various sizes (e.g., 64×64, 32×32, and 16×16), processing blocks having various sizes may still reduce complexity, but the size of a buffer memory should be increased. Furthermore, it is still difficult to process a block having a smaller size (e.g., a 16×16 block) in real time.

Referring to FIG. 4A, a 64×64 block 410 and 32×32 blocks 420 are shown. The 64×64 block 410 is split into four 32×32 blocks 420, and data processing is sequentially performed with respect to the respective 32×32 blocks 420. Meanwhile, each of the 32×32 blocks 420 may become a block processing unit. In other words, operations of a general decoding process including entropy decoding, inverse-quantization/inverse-transformation, intra/inter prediction, reconstruction, and filtering are performed by a partition block or an individual block.

Figure 4B:
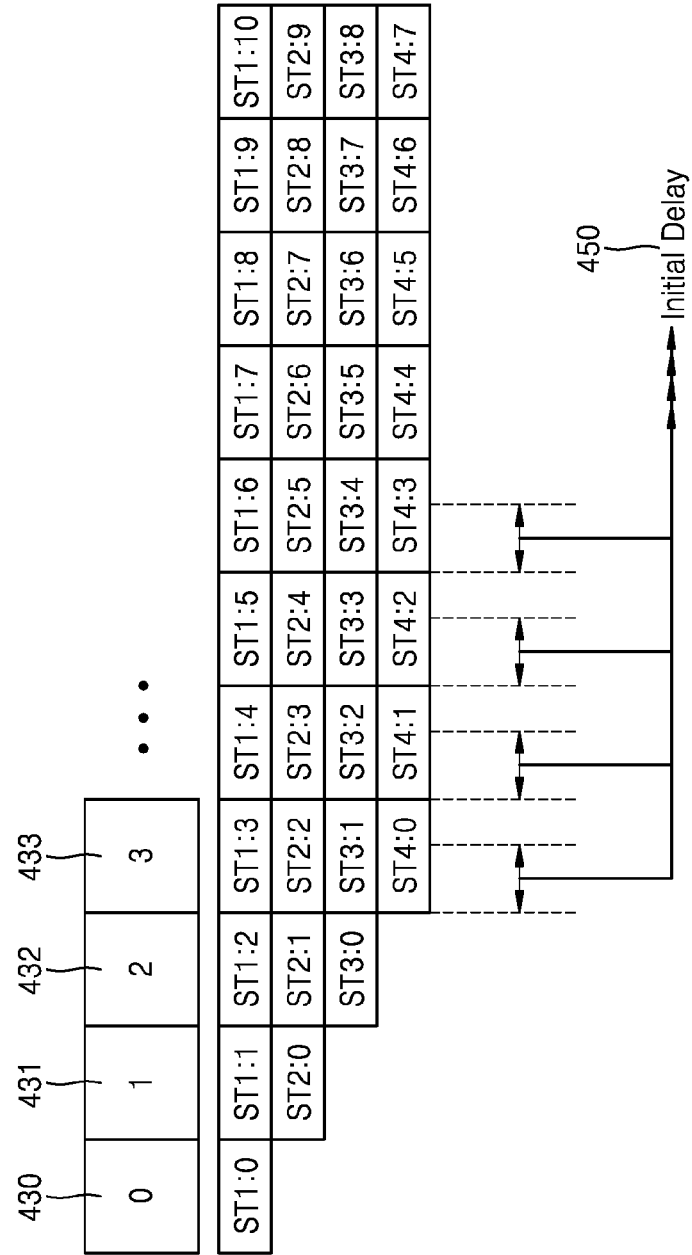
FIG. 4B is a diagram illustrating a parallel-pipeline decoding process performed by a block according to an exemplary embodiment.

FIG. 4B is a diagram illustrating a parallel-pipeline decoding process performed by a block according to an exemplary embodiment.

Referring to FIG. 4B, data processing stages with regard to an initial block 430, a first block 431, a second block 432, and a third block 433 are performed in a parallel-pipeline structure. Here, each of the data processing stages may be a decoding process and may consist of operations including entropy decoding, inverse-quantization/inverse-transformation, intra/inter predictions, reconstruction, and filtering.

Entropy decoding is an operation for entropy-decoding a bitstream input from a memory, and inverse-quantization/inverse-transformation is an operation for inverse-quantizing the entropy-decoded bitstream and inverse-transforming the inverse-quantized bitstream. Intra prediction is an operation for reading out an in-screen reference image from the memory and performing prediction, whereas the inter prediction is an operation for reading out a reference image stored in the memory and performing motion compensation. Here, due to a large size, a reference image is stored in the memory and may be provided via a cache. The filtering may include deblocking filtering for reducing a blocking phenomenon that may occur between blocks during reconstruction of the data.

Hereafter, a parallel-pipeline decoding process will be described in detail. An image decoding apparatus sequentially delays entropy decoding, inverse-quantization/inverse-transformation, motion compensation, and filtering calculation according to a cycle by a block unit and performs the operations in parallel. At the same time, the image decoding apparatus pipelines data transmissions between respective processors. For example, the image decoding apparatus receives an input of a bitstream parsed at a previous stage and performs entropy-decoding with regard to the initial block 430 (ST1:0). Next, simultaneously as a bitstream regarding the entropy-decoded initial block 430 is inverse-quantized/inverse-transformed, entropy-decoding is performed with regard to the first block 431 (ST2:0, ST1:1). Furthermore, when an image is compressed based on inter prediction, simultaneously as motion compensation is performed with regard to the initial block 430, inverse-quantization/inverse-transformation are performed with regard to the first block 431 and entropy-decoding is performed with regard to the second block 432 (ST3:0, ST2:1, ST1:2). Furthermore, simultaneously as filtering operation is performed with regard to the motion-compensated initial block 430 to eliminate blocking artifacts, motion compensation is performed with regard to the first block 431, inverse-quantization/inverse-transformation are performed with regard to the second block 432, and entropy-decoding is performed with regard to the third block 433 (ST4:0, ST3:1, ST2:2, ST1:3).

Meanwhile, in a parallel-pipeline decoding process, memory access with respect to each block may be necessary to perform each decoding operation. Memory accesses may include: 1) a memory access for entropy-decoding, 2) a memory access for inter mode prediction with regard to each block size, 3) a memory access with respect to surrounding blocks for intra mode prediction, 4) a memory access for filtering, and 5) a memory access for writing a final reconstructed image to a memory.

Referring to FIG. 4B, when a parallel-pipeline decoding process is performed by an individual block, N (N is an integer) memory accesses occur with respect to N blocks in an arbitrary decoding operation, and thus N delays 450 occur with respect to the N blocks. However, as various block processing units are employed by an image decoding system, blocks of smaller sizes may be utilized. Therefore, when a block of a small size (e.g., a 16×16 block) is employed as a data processing unit, the number of memory accesses to perform decoding rapidly increases and a bus initial delay time also increases, and thus it becomes difficult to perform image decoding in real time. Therefore, processing speed of an image decoding system may be increased by reducing the number of delays and an initial delay time.

Figure 5A:
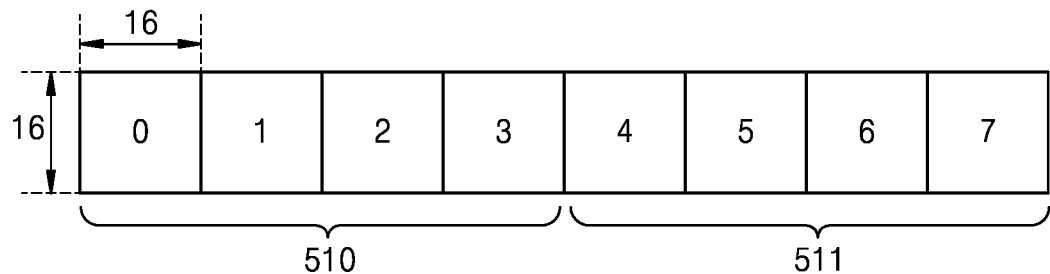
FIG. 5A is a diagram illustrating a block processing unit of an image decoding system according to an exemplary embodiment.

FIG. 5A is a diagram illustrating a block processing unit of an image decoding system according to an exemplary embodiment.

Referring to FIG. 5A, groups 510 and 511 of 16×16 blocks are shown. In an image decoding system according to an exemplary embodiment, a block group including one or more blocks becomes a data processing unit. For example, four 16×16 blocks may constitute a single block group and may become a data processing unit. For example, a block group including initial through third blocks (0-3) may constitute a first block group 510, whereas a block group including fourth through seventh blocks (4-7) may constitute a second block group 511. Here, in a decoding process according to an exemplary embodiment, entropy-decoding, inverse-quantization/inverse-transformation, intra/inter predictions, reconstruction, and filtering are performed on a block group.

Figure 5B:
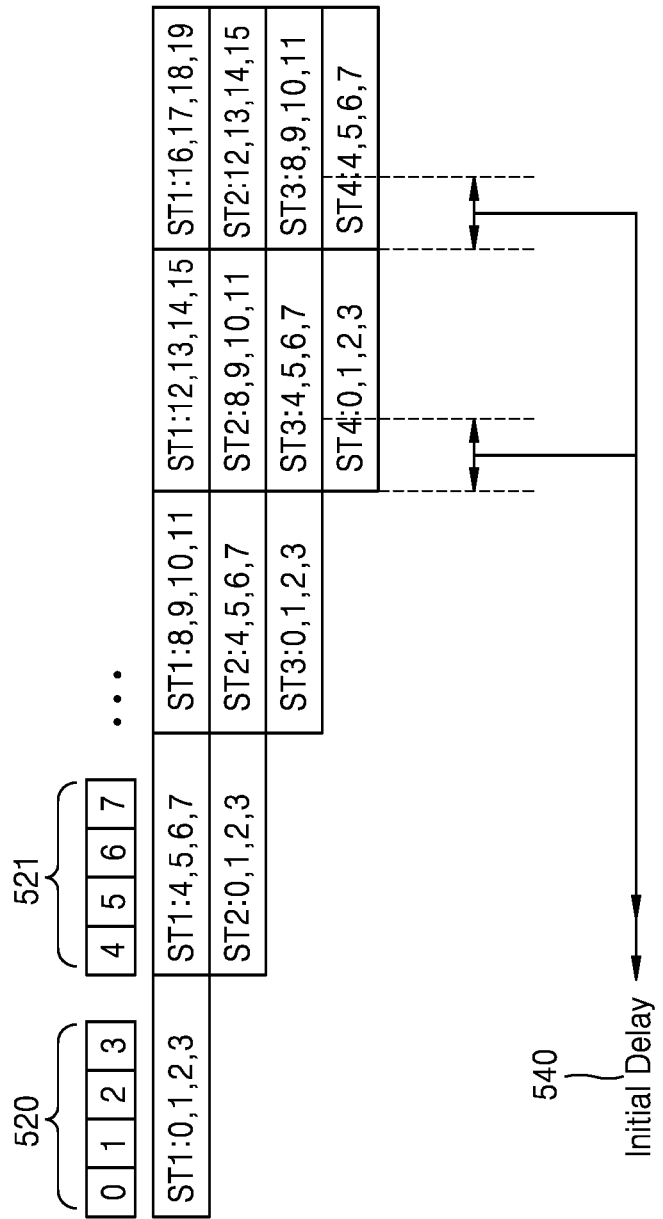
FIG. 5B is a diagram illustrating a parallel-pipeline decoding process performed on a block group according to an exemplary embodiment.

FIG. 5B is a diagram illustrating a parallel-pipeline decoding process performed on a block group according to an exemplary embodiment.

Referring to FIG. 5B, data processing operations are performed with regard to respective block groups 520 and 521 in a parallel-pipeline structure. Here, the data processing operations are decoding operations and may include entropy-decoding, inverse-quantization/inverse-transformation, intra/inter prediction, reconstruction, and filtering. The data processing operations may be performed by the devices illustrated in FIGS. 1-3.

Hereinafter, a parallel-pipeline decoding process performed by a block group according to an exemplary embodiment will be described in detail. The image decoding apparatus sequentially delays entropy decoding, inverse-quantization/inverse-transformation, motion compensation, and filtering calculation according to a cycle by a block unit and performs the operations in parallel. At the same time, the image decoding apparatus pipelines data transmissions between respective processors. For example, the image decoding apparatus 100 according to an exemplary embodiment receives an input of a bitstream parsed at a previous stage and performs entropy-decoding with regard to a first block group 520 (ST1:0, 1, 2, 3). Next, simultaneously as the entropy-decoded bitstream regarding the first block group 520 is inverse-quantized/inverse-transformed, entropy-decoding is performed with regard to a second block group 521 (ST2:0, 1, 2, 3, ST1:4, 5, 6, 7). Furthermore, when an image is compressed based on inter prediction, simultaneously as motion compensation is performed with regard to the first block group 520, inverse-quantization/inverse-transformation are performed with regard to the second block group 521 and entropy-decoding is performed with regard to a third block ( . . . ) (ST3:0, 1, 2, 3, ST2:4, 5, 6, 7, ST1:8, 9, 10, 11). Furthermore, simultaneously as filtering operation is performed with regard to the motion-compensated first block group 520 to eliminate blocking artifacts, motion compensation is performed with regard to the second block group 521, inverse-quantization/inverse-transformation are performed with regard to the third block ( . . . ), and entropy-decoding is performed with regard to a fourth block ( . . . ) (ST4:0, 1, 2, 3, ST3:4, 5, 6, 7, ST2:8, 9, 10, 11, ST1: 12, 13, 14, 15). Here, each of the above-stated block groups may include four 16×16 blocks.

Referring to FIG. 5B, because the image decoding apparatus according to an exemplary embodiment performs a parallel-pipeline decoding process by a block group, a bus initial delay 540 occurs once with respect to a single block group including N blocks in an arbitrary decoding operation. In other words, compared to processing in which a decoding process is performed by an individual block, the total number of bus initial delays is reduced to 1/N.

As described above, the image decoding apparatus processes data by a block group, and thus the number of initial delays that occur while a memory is being accessed may be reduced. Effects of reduction of the initial delays include increased real-time processing speed of the image decoding apparatus and reduce power consumption of the image decoding apparatus due to efficient utilization of an operation frequency.

For example, when a block processing unit includes 16×16 blocks during a ultra high definition (UHD) process that provides a high resolution of 3,840×2,176, it is necessary to process 1,958,400 blocks per frame for a frame rate of 60 Hz. Furthermore, assuming an operation frequency of 450 MHz of the image decoding apparatus, the number of cycles that may be employed for processing one 16×16 block is about 230 cycles, and about 150 cycles thereof are spent as bus initial delay time due to memory accesses with respect to individual blocks. However, when the image decoding apparatus groups four 16×16 blocks into a single block group and accesses the memory by the block group, the bus initial delay time may be reduced as low as to ¼. In other words, as blocks are processed by a block group, time spent due to initial delays may be reduced from 4,896,000 cycles per frame to 1,224,000 cycles per frame. Therefore, the overall processing speed may be increased by about 220 MHz.

Figure 6:
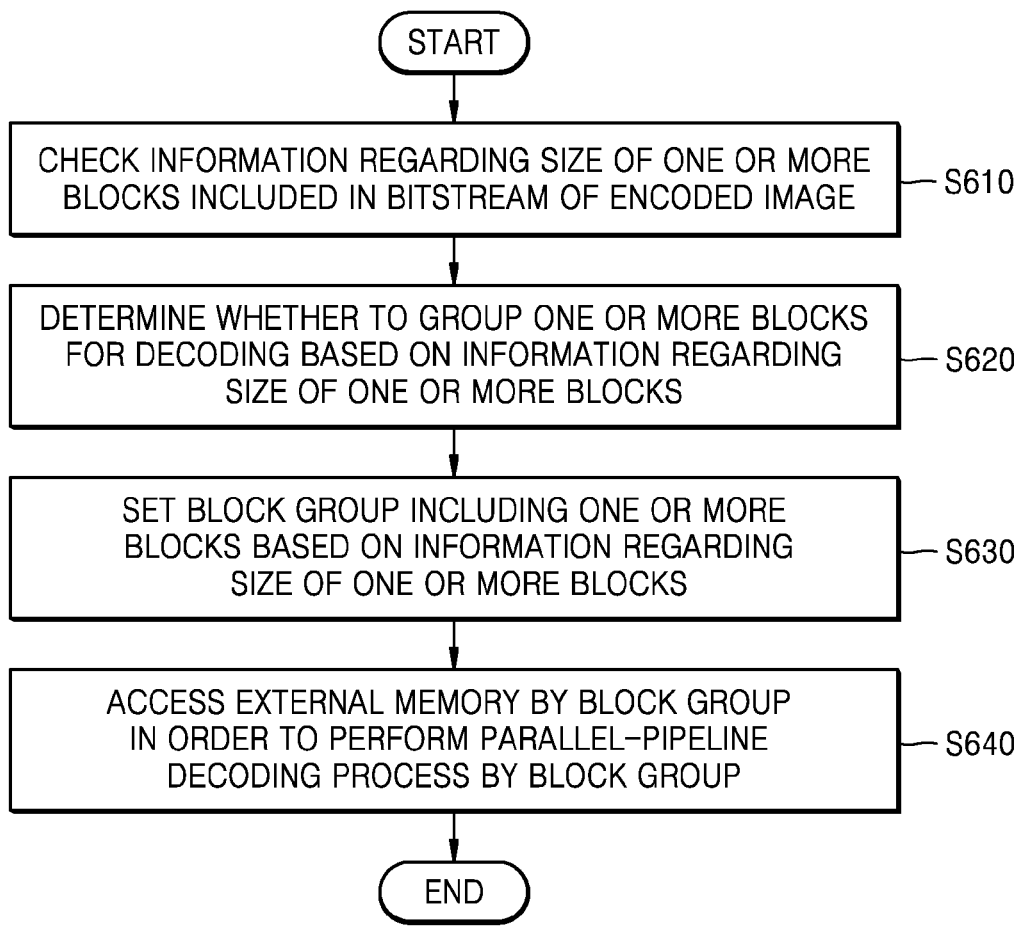
FIG. 6 is a flowchart of an image decoding method according to an exemplary embodiment.

FIG. 6 is a flowchart for describing an image decoding method according to an exemplary embodiment.

The operations illustrated in FIG. 6 may be executed by the devices illustrated in FIGS. 1-3.

Referring to FIG. 6, in operation S610, the image decoding apparatus checks size information regarding the size of one or more blocks included in a bitstream of an encoded image.

In operation S620, the image decoding apparatus determines whether to group one or more blocks for performing decoding, based on the information regarding the size of the one or more blocks.

In operation S630, the image decoding apparatus sets a block group including one or more blocks based on the information regarding the size of the one or more blocks.

In operation S640, the image decoding apparatus accesses a memory by a block group to perform a parallel-pipeline decoding process by the block group.

It should be understood that exemplary embodiments described herein should be considered in a descriptive sense only and not for purposes of limitation. Descriptions of features or aspects within each embodiment should typically be considered as available for other similar features or aspects in other exemplary embodiments.

The inventive concept can also be embodied as computer readable codes on a non-transitory computer readable recording medium. The non-transitory computer readable recording medium is any data storage device that can store data which can be thereafter read by a computer system. Examples of the non-transitory computer readable recording medium include read-only memory (ROM), random-access memory (RAM), CD-ROMs, magnetic tapes, floppy disks, optical data storage devices, etc. The non-transitory computer readable recording medium can also be distributed over network coupled computer systems so that the computer readable code is stored and executed in a distributed fashion.

What is claimed is:

1. A method of decoding an image, the method comprising:
   obtaining size information regarding a size of one or more blocks included in a bitstream of an encoded image;
   grouping a plurality of blocks among the one or more blocks into a block group for performing decoding of the plurality of blocks, based on the size information of the plurality of blocks;
   requesting reference image data corresponding to the plurality of blocks included in the block group from a memory in a memory access request signal; and
   performing a parallel-pipeline decoding process on the block group, based on the reference image data corresponding to the plurality of blocks included in the block group,
   wherein the requesting comprises:
   analyzing a motion vector by the block group;
   accessing a multi-way set associative cache by the block group to obtain the reference image data corresponding to the plurality of blocks included in the block group based on a result of the analysis; and
   if a cache miss occurs while the multi-way set associative cache is being accessed, updating the multi-way set associative cache based on the result of analyzing the motion vector by the block group.

2. The method of claim 1, wherein the parallel-pipeline decoding process comprises operations for entropy decoding, inverse-quantization/inverse-transformation, intra/inter prediction, reconstruction, and filtering calculation, and
   wherein each of the operations are sequentially delayed according to a cycle by the block group and performed in parallel.

3. The method of claim 1, wherein the grouping comprises:
   determining that the size information of the plurality of blocks indicates that the size of each of the plurality of blocks one or more blocks is less than 16×16 or is 16×16; and
   grouping the plurality of blocks in response to determining that the size information of the plurality of blocks indicates that the size of each of the plurality of blocks one or more blocks is less than 16×16 or is 16×16.

4. The method of claim 1, wherein the plurality of blocks are four 16×16 blocks, and
   wherein the block group comprises the four 16×16 blocks.

5. The method of claim 1, wherein the requesting comprises obtaining the reference image data corresponding to the plurality of blocks in the block group from the memory to perform motion compensation.

6. The method of claim 5, wherein, the obtaining comprises:
   generating the memory access request signal by combining request signals for requesting reference image data corresponding to the plurality of blocks included in the block group;
   transmitting the memory access request signal to the memory; and
   obtaining the reference image data corresponding to the plurality of blocks included in the block group during a single memory access cycle.

7. The method of claim 5, further comprising:
   checking a motion vector by the block group; and
   if the motion vector indicates a half pixel or a quarter pixel, performing interpolation with regard to the reference image data corresponding to the plurality of blocks included in the block group.

8. The method of claim 5, wherein the obtaining comprises accessing a local cache by the block group to obtain the reference image data corresponding to the plurality of blocks included in the block group.

9. An image decoding apparatus configured to accesses a memory by a block group, the image decoding apparatus comprising:
   an image decoder configured to perform a parallel-pipeline decoding process on a block group of a plurality of blocks; and
   a memory configured to store data decoded by the image decoder,
   wherein the image decoder comprises a controller configured to obtain size information regarding a size of one or more blocks included in a bitstream of an encoded image, group the plurality of blocks for performing decoding of the plurality of blocks, based on the size information of the plurality of blocks, request reference image data corresponding to the plurality of blocks included in the block group from a memory in a memory access request signal, and perform a parallel-pipeline decoding process on the block group based on the reference image data corresponding to the plurality of blocks included in the block group, wherein the controller configured to request the reference image data corresponding to the plurality of blocks in the block group from the memory by:

analyzing a motion vector by the block group;

accessing a multi-way set associative cache by the block group to obtain the reference image data corresponding to the plurality of blocks included in the block group based on a result of the analysis, and if a cache miss occurs while the multi-way set associative cache is being accessed, the controller configured to update the multi-way set associative cache based on the result of analyzing the motion vector by the block group.

10. The image decoding apparatus of claim 9, wherein the parallel-pipeline decoding process comprises operations for entropy decoding, inverse-quantization/inverse-transformation, intra/inter prediction, reconstruction, and filtering calculation, and wherein each of the operations are sequentially delayed according to a cycle by the block group and performed in parallel.

11. The image decoding apparatus of claim 9, wherein the controller is configured to group the plurality of blocks by:

determining that the size information of the plurality of blocks indicates that the size of each of the plurality of blocks one or more blocks is less than 16×16 or is 16×16; and grouping the plurality of blocks in response to determining that the size information of the plurality of blocks indicates that the size of each of the plurality of blocks one or more blocks is less than 16×16 or is 16×16.

12. The image decoding apparatus of claim 9, wherein the plurality of blocks are four 16×16 blocks, and wherein the block group comprises the four 16×16 blocks.

13. The image decoding apparatus of claim 9, wherein the controller is configured to obtain the reference image data corresponding to the plurality of blocks in the block group from the memory to perform motion compensation.

14. The image decoding apparatus of claim 13, wherein the controller is configured to obtain the reference image data corresponding to the plurality of blocks in the block group from the memory by:

generating the memory access request signal by combining request signals for requesting reference image data corresponding to the plurality of blocks included in the block group;

transmitting the memory access request signal to the memory; and obtaining the reference image data corresponding to the plurality of blocks included in the block group during a single memory access cycle.

15. The image decoding apparatus of claim 13, wherein the image decoder is further configured to check a motion vector by the block group and, if the motion vector indicates a half pixel or a quarter pixel, to perform interpolation with regard to the reference image data corresponding to the plurality of blocks included in the block group.

16. The image decoding apparatus of claim 13, wherein the controller is further configured to obtain the reference image data corresponding to the plurality of blocks in the block group from the memory by accessing a local cache by the block group to obtain the reference image data corresponding to the plurality of blocks included in the block group.

17. A non-transitory computer readable recording medium having recorded thereon a computer program, which when executed by a decoding apparatus causes the decoding apparatus to execute a method of decoding an image, the method comprising:

obtaining size information regarding a size of one or more blocks included in a bitstream of an encoded image;

grouping a plurality of blocks among the one or more blocks into a block group for performing decoding of the plurality of blocks, based on the size information of the plurality of blocks;

requesting reference image data corresponding to the plurality of blocks included in the block group from a memory in a memory access request signal; and performing a parallel-pipeline decoding process on the block group, based on the reference image data corresponding to the plurality of blocks included in the block group, wherein the requesting comprises:

analyzing a motion vector by the block group;

accessing a multi-way set associative cache by the block group to obtain the reference image data corresponding to the plurality of blocks included in the block group based on a result of the analysis; and if a cache miss occurs while the multi-way set associative cache is being accessed, updating the multi-way set associative cache based on the result of analyzing the motion vector by the block group.

* * * * *